United States Patent [19]
Booth et al.

[11] Patent Number: 5,835,127
[45] Date of Patent: Nov. 10, 1998

[54] INTEGRATED ELECTRONIC SYSTEM UTILIZING A UNIVERSAL INTERFACE TO SUPPORT TELEPHONY AND OTHER COMMUNICATION SERVICES

[75] Inventors: Marc Booth, La Habra; Hironori Kobayashi, Newport Beach, both of Calif.; James E. Wicks, Tarrytown, N.Y.; Howard Allen Williams, Jr., Corona, Calif.

[73] Assignees: Sony Corporation, Japan; Sony Trans Com, Inc., Del.

[21] Appl. No.: 639,287

[22] Filed: Apr. 25, 1996

[51] Int. Cl.$^6$ ............................. H04N 7/10; H04N 7/14
[52] U.S. Cl. .................................. 348/8; 348/6; 348/12; 455/6.3
[58] Field of Search ............................. 348/8, 6, 7, 12, 348/13; 455/6.2, 6.3, 6.1, 5.1, 4.2, 3.1; H04N 7/10, 7/14

[56] References Cited

U.S. PATENT DOCUMENTS

| | | | |
|---|---|---|---|
| 4,056,696 | 11/1977 | Meyerle et al. | 179/100 |
| 4,499,549 | 2/1985 | Bartlett | 364/601 |
| 4,835,604 | 5/1989 | Kondo et al. | 455/6.3 |
| 4,958,381 | 9/1990 | Toyoshima | 348/8 |
| 5,034,996 | 7/1991 | Carey et al. | 348/8 |
| 5,214,505 | 5/1993 | Rabowsky et al. | 348/8 |
| 5,311,302 | 5/1994 | Berry et al. | 348/14 |
| 5,524,050 | 6/1996 | Boerema et al. | 379/441 |
| 5,568,484 | 10/1996 | Margis | 348/8 |
| 5,613,234 | 3/1997 | Vella-Coleiro | 455/340 |
| 5,617,331 | 4/1997 | Wakai et al. | 455/6.3 |
| 5,627,891 | 5/1997 | Gallagher et al. | 379/455 |

FOREIGN PATENT DOCUMENTS

| | | |
|---|---|---|
| 0363555 | 3/1989 | European Pat. Off. . |
| 0557058 | 8/1993 | European Pat. Off. . |
| WO95/29552 | 4/1995 | WIPO . |

OTHER PUBLICATIONS

"Two–Way Street" *Inflight*, Harbison & Dunn, pp. 14–18 (Mar. 1996).
"Airframers Force Disipline in High–Stakes IFE Market" *Aerospace Business*, Velocci, pp. 41–43 (Mar. 25, 1996).
"MDDS Is Here!" *Digital Video News* P1 (Jul. 1995).
"Flying Those Interactive Skies" *TV Technology*, Morris (Oct. 1995).
"Optibase & BEA Make MPEG Fly!", Unlisted, *Digital Video News* Jul. 1995.
"Video–On–Demand Trail Starts on Alitalia Airlines Other Airplane Tests Have Same Maddening Delays as Cable/Telco Trials", Unlisted, *European Media Business & Finance* Nov. 3, 1995.
"BE Aerospace Interactive Video System Successfully Debuts on British Airways B747; Company Awarded $33 Million in New Seating Programs" Unlisted, *Business Wire* Nov. 21, 1995.
"TNCi Continues Airview (TM) Enhancement with Telephone Interface", Unlisted, *PR Newswire* Nov. 28, 1995.
"First Totally Digitalized In–Flight Entertainment System to be Introduced on International Carier—Alitalia; IFT System will Debut on Rome to Chicago Flight Dec. 1st", Unlisted, *Business Wire* Nov. 30, 1995.
"TNC to Put Internet Service into its IFE", Unlisted, *In–Flight Entertainment* Jan. 1996.

Primary Examiner—John K. Peng
Assistant Examiner—Vivek Srivastava
Attorney, Agent, or Firm—Blakely, Sokoloff, Taylor & Zafman LLP

[57] ABSTRACT

An integrated electronic system that provides telephone, interactive entertainment and other amenities on a vehicle of transportation. The integrated electronic system includes a passenger control unit coupled through a multiple seat electronic unit via a universal interface. The integrated electronic system further includes a passenger control handset directly coupled to the passenger control unit to provide telephony and display control information to the passenger control unit. The passenger control unit appropriately routes the information to the multiple seat electronics unit through the universal interface.

16 Claims, 8 Drawing Sheets

INTEGRATED ELECTRONIC SYSTEM UTILIZING A UNIVERSAL INTERFACE TO SUPPORT TELEPHONY AND OTHER COMMUNICATION SERVICES

BACKGROUND OF THE INVENTION

1. Field of the Invention

The present invention relates to the field of telecommunications. More particularly, the present invention relates to an integrated electronic system, typically situated in commercial aircraft, that preferably supports telephony, interactive entertainment and other amenities available to its passengers and features a universal interface between a multiple seat electronic unit and the integrated electronic system.

2. Description of Art Related to the Invention

Over the last few decades, commercial aircraft has become a necessary mode of travel for personal and business reasons. A few years ago, many commercial airlines began offering on-board telephone services by implementing telephone units at specific locations within the cabin of the commercial aircraft. Typically, as shown in FIG. 1A, each telephone unit 10 includes a telephone storage compartment 11 installed into the back of a passenger seat 22 (e.g., a middle seat of a group of three passenger seats) and a telephone handset 12 placed in the telephone storage compartment 11 during non-use. The telephone handset 12 is directly connected to a first multiple seat electronic unit ("SEU") 20 which transfers information to telephony circuitry (not shown) when the telephone handset 12 is being used. The telephony circuitry establishes and maintains audio-based communications with a remotely located telephone.

Recently, in order to improve passenger comfort, commercial airlines are now offering a number of interactive entertainment activities that can be enjoyed while seated such as, for example, playing a video game, viewing destination guides, reserving hotel accommodations and the like. This is accomplished by further installing liquid crystal displays 30 onto the back of each of the passenger seats 21–23 as shown or by mounting the liquid crystal displays 30 to an armrest of the passenger seat. These liquid crystal displays 30 are controlled by a hand-held control unit 40. Both the liquid crystal display 30 and the hand-held control unit 40 are directly coupled to a second SEU 50 which receives control signals from the hand-held control unit 40 to display movies or to select a menu representing one of a number of interactive entertainment activities.

The disadvantages associated with the above-described telephony and interactive system are numerous. One disadvantage is that both the telephone unit 10 and the hand-held control unit 40 are coupled to different SEUs resulting in the use of extraneous hardware and circuitry. Of course, the extraneous materials increase the cost in manufacturing the aircraft and reduce the amount of cabin space available for passengers. Albeit, even if both the telephone unit 10 and control unit 40 were directly coupled to the same SEU, redundant interconnects (i.e. wiring components) still would be necessary thereby increasing its cost (labor and materials) and increasing its tendency of failure.

To avoid the disadvantages associated with the typical telephony and interactive system of FIG. 1A, there has been a recent effort to develop a hand-held, all-purpose control unit as shown in FIG. 1B that connects to one SEU. The all-purpose control unit 60 includes a telephone handset portion 70 and a display control portion 80. The telephone handset portion 70 enables a passenger to make telephone calls while the display control portion 80 enables the passenger to participate in interactive entertainment activities illustrated on a liquid crystal display 90. The display control portion 80 further includes control buttons for controlling requisite in-flight amenities such as turning on/off the reading light, calling the flight attendant, controlling the volume and channel of in-flight audio services and the like.

The primary disadvantage associated with this effort is that the all-purpose control unit 60 fails to provide an integrated electronic system that can be implemented in a piecemeal fashion to provide requisite in-flight amenities without providing telephony or display services, but is adaptable so that telephony and interactive display controls can be installed at a later date by simply interconnecting a handset to the existing electronic system.

Therefore it would be advantageous to develop an integrated electronic system which overcomes all of the above-identified disadvantages.

SUMMARY OF THE INVENTION

The present invention relates to an integrated electronic system and method for providing telephony, interactive entertainment and other amenities on a commercial vehicle. The integrated electronic system includes a universal interface between a single multiple seat electronics unit ("SEU") and a passenger control unit ("PCU"). The interface is configured to support in-flight amenities (e.g., reading light control, audio volume and channel control, etc.) associated with the PCU. Moreover, it is configured to appropriately support telephony and display control signals from a passenger control handset ("PCH") that is coupled to the PCU. As a result, the system architecture of the present invention is flexible enough so that the PCH does not have to be implemented concurrently with the PCU. Additionally, implementation of the PCH may be easily accomplished by connecting the PCH to the PCU rather than directly to the SEU.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to an integrated electronic system having a universal interface between a multiple seat electronic unit ("SEU") and the integrated electronic system which includes (i) a passenger control handset ("PCH") that operates as both a telephone and a control unit for a display and (ii) a passenger control unit ("PCU") coupled to both the universal interface and the PCH in order to control requisite in-flight amenities and to assist in transferring data between the PCH and the SEU. Herein, a number of illustrative embodiments are described in order to convey the spirit and scope of the present invention. In addition, numerous specific details are set forth, such as exemplary types of serial data lines, which are useful but not required to practice the present invention.

Figure 1A:
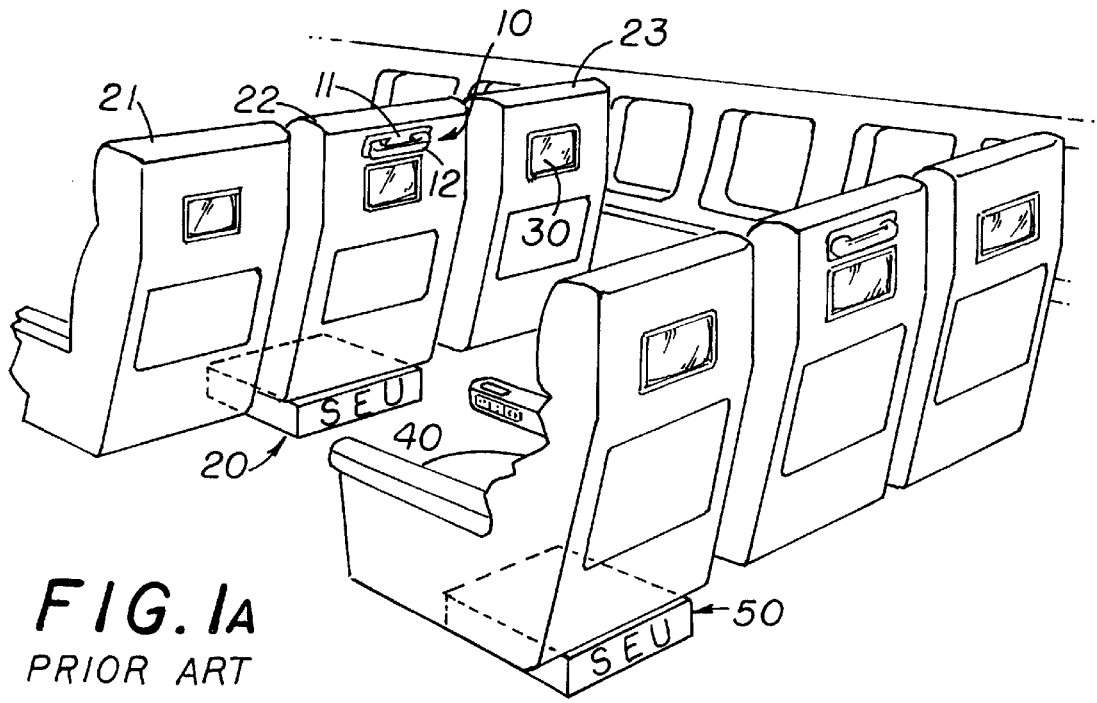
FIG. 1A is a exploded perspective view of a typical passenger aisle of a commercial aircraft in which each passenger is provided telephony and interactive video services through separate SEUs.
Figure 1B:
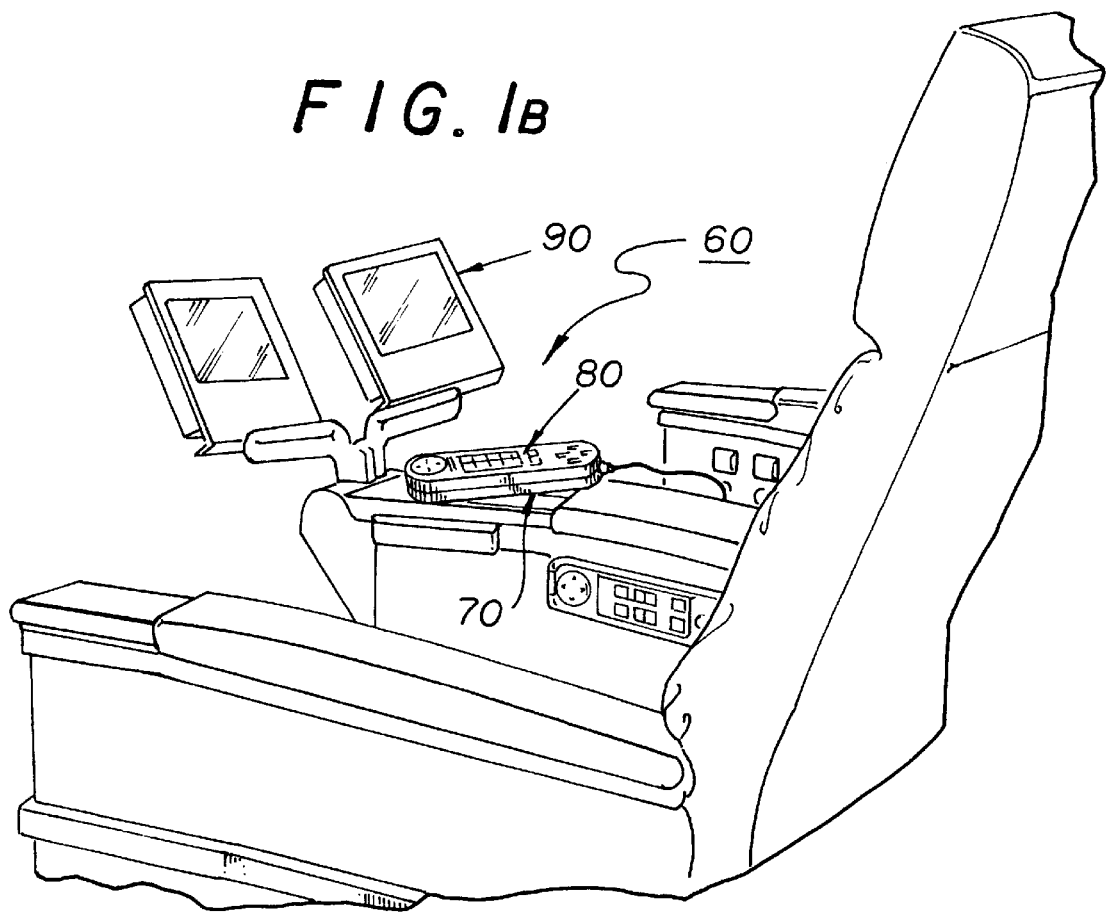
FIG. 1B is a perspective view of a passenger seat of a commercial aircraft in which a passenger controls telephony, interactive entertainment and requisite in-flight amenity selection through a handset connected to a single SEU.
Figure 2:
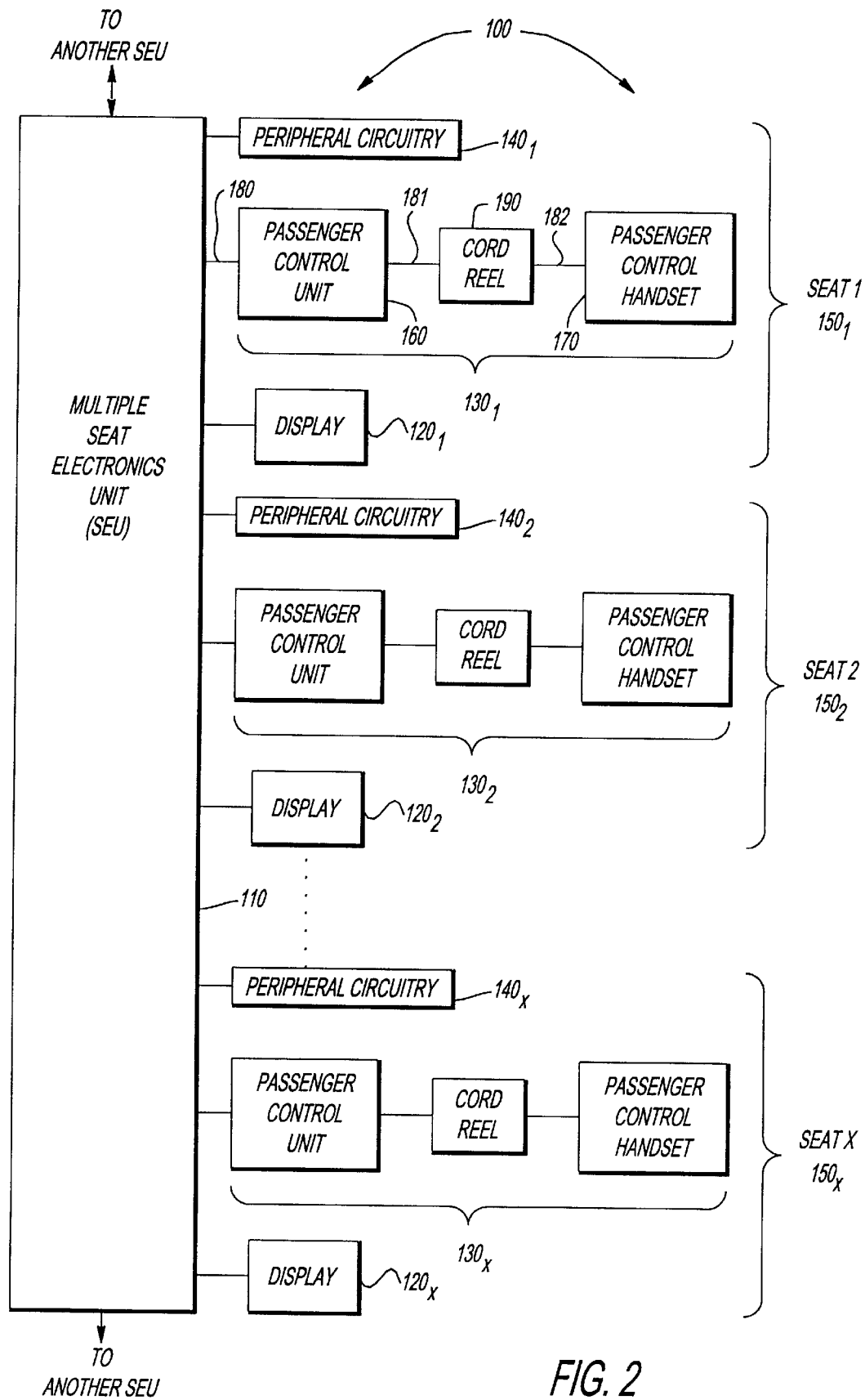
FIG. 2 is an illustrative block diagram of an integrated electronic system of the present invention in association with each seat of a group of passenger seats and in communication with a single multiple seat electronic unit.

Referring to FIG. 2, a simplified block diagram of the electronic circuitry associated with a group of "x" passenger seat(s) $150_1$–$150_x$ ("x≧1" and a whole number) on a commercial aircraft is shown. The electronic circuitry 100 includes a plurality of multiple seat electronic units ("SEUs") coupled together in series. Each SEU (e.g., SEU 110) is coupled to a display $120_1$–$120_x$ (e.g., a flat panel display including a liquid crystal display), an integrated electronic system $130_1$–$130_x$ and possibly peripheral circuitry $140_1$–$140_x$ supporting a modem connector (e.g., RJ-11 connector) or head phone connector if one or both of these connectors are not supported by the integrated electronic systems. Each passenger seat $150_1$–$150_x$ is uniquely assigned to a display $120_1$–$120_x$, integrated electronic system $130$–$130_x$ and peripheral circuitry $140_1$–$140_x$, respectively. Based on input signals from the integrated electronic systems $130_1$–$130_x$ or the peripheral circuitry $140_1$–$140_x$ (if implemented), the SEU 110 performs operations on the input and responds appropriately (e.g., sends signals to on-board telephony circuitry to make a call, alter images displayed or a menu selection on the display and the like). The SEU 110 is usually mounted under one of the group of passenger seats $150_1$ . . . or $150_x$.

Figure 6:
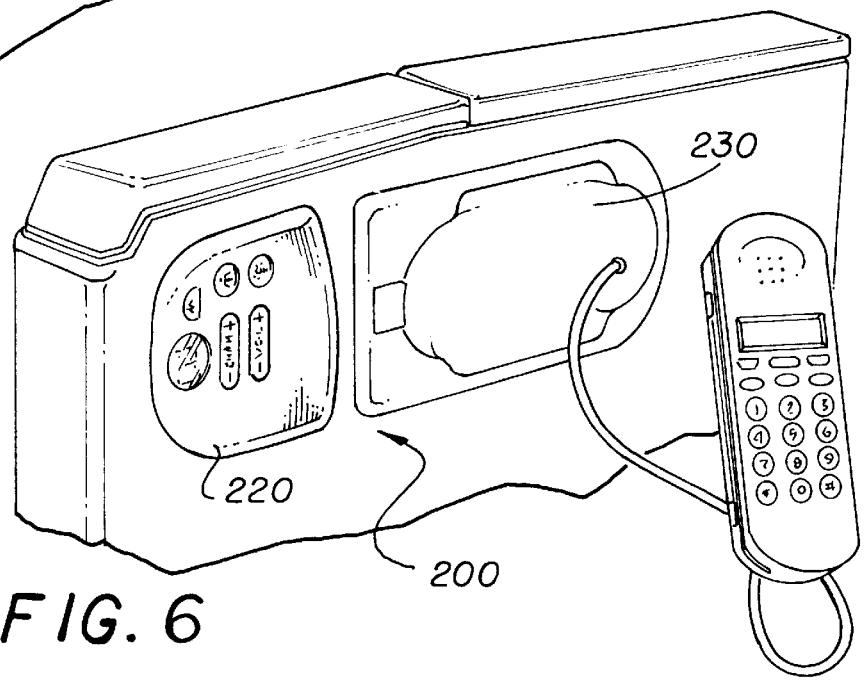
FIG. 6 is a perspective view of a third embodiment of the integrated electronic system including the passenger control unit which may be separately located from the passenger control handset.

Each integrated electronic system $130_1$–$130_x$ (e.g., system $130_1$) includes at least a passenger control unit ("PCU") 160 coupled to the SEU 110 through a communication path 180. Preferably, the PCU 160 is coupled to a passenger control handset ("PCH") 170 through another communication path 181. As shown in FIG. 2 and FIG. 6, the communication path 181 features a cable having a plurality of signal lines coupled to the PCU 160 preferably through a cord reel 190.

Figure 3:
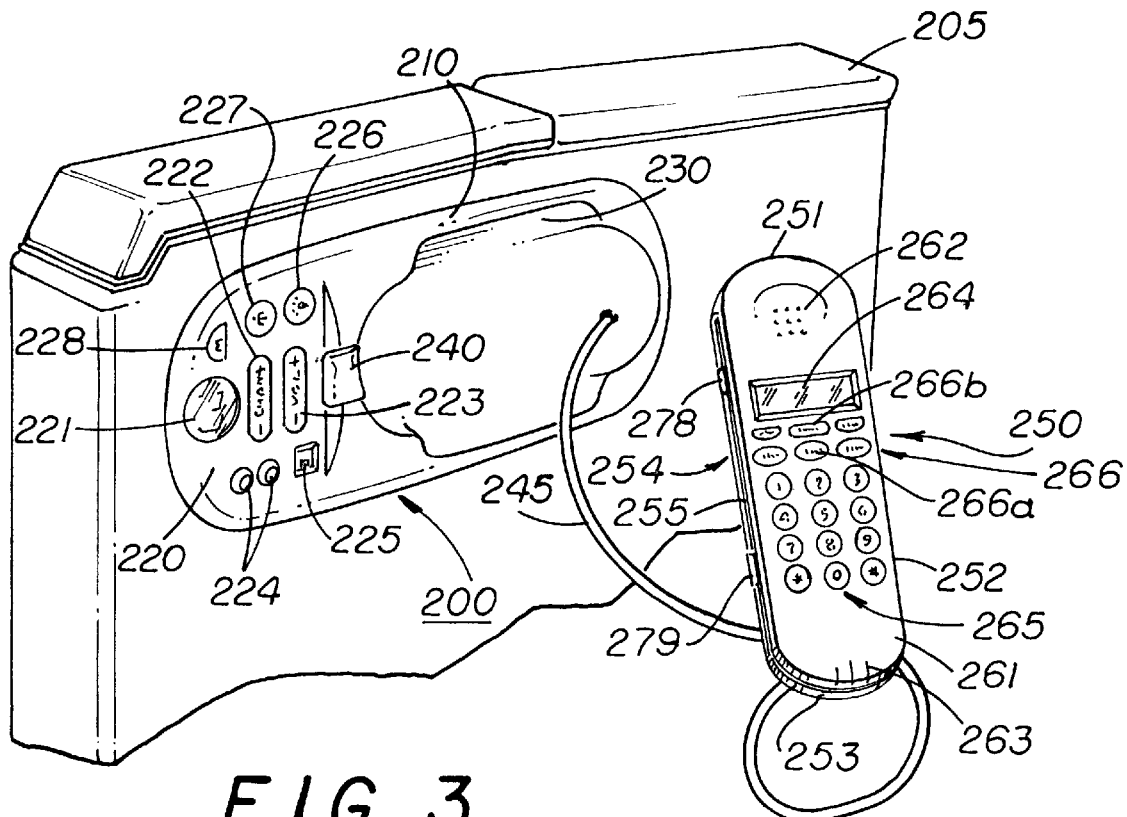
FIG. 3 is a perspective view of a first embodiment of the integrated electronic system including a passenger control unit incorporated within an island unit and a passenger control handset coupled to the passenger control unit.

The cord reel 190 is adapted to maintain the cable coupled to the PCH 170 generally taut so that it recoils when the PCH 170 is returned to its stored condition as discussed in FIG. 3.

The peripheral circuitry $140_1$–$140_x$ may include two connectors; namely, a head phone connector and a modem connector. The head phone connector provides the passenger audio upon inserting a connector of a headset therein. Similarly, the modem connector allows the passenger to exchange information between a remotely located source and his or her computer. It is contemplated, however, that one or both of these connectors may be implemented within the PCU 160 as shown in FIG. 3.

Referring now to FIG. 3, a perspective view of a first embodiment of the integrated electronic system 200 which is installed within an armrest 205 of a commercial aircraft as shown. The integrated electronic system 200 includes an island unit 210 featuring the passenger control unit ("PCU") 220 and a compartment 230 sufficiently sized to store the passenger control handset ("PCH") 250. The island unit 210 is preferably designed with length and width dimensions of at most 10 inches and 3.5 inches of which approximately two inches are utilized by the PCU 220. A locking mechanism 240 is placed proximate to the periphery of the compartment 230 to become engaged with a first edge 251 of the PCH 250 in order to maintain the PCH 250 within the compartment 230 during non-use. The PCH 250 is released from the compartment 230 by firmly depressing the locking mechanism 240. The island unit 210 including the casing of the PCU 220 and compartment 230 is made of plastic fabricated through an injection molding process such as a polycarbonate, although another type of polymer may be used.

As shown, the PCU 220 includes a light emitting diode ("LED") display 221, a pair of audio control buttons 222–223, a dual-input headphone connector 224, a modem connector 225 and a plurality of miscellaneous control buttons 226–228, all of which are supported by a circuit board or flex circuitry encased with the casing of the PCU 220. The LED display 221 illustrates the in-flight audio channel currently selected by the passenger such as, for example, a channel featuring rock 'n roll music, audio for video movies or other types of audio. The pair of audio control buttons 222–223 controls the selection of the in-flight audio channel and the volume of the audio, respectively. The dual-input headphone connector 224 is a female type connector into which a passenger is to insert a male connector of a headset (not shown) in order to listen to the audio. The modem connector 225 provides a communication path for the passenger to send information from his or her computer to a remotely located destination and to receive information from a remotely located source. The plurality of miscellaneous control buttons 226–228 are configured to perform certain requisite in-flight amenities. For example, a first control button 226 is a switch for the reading light assigned to the passenger seat. Likewise, a second control button 227 is a call button for a flight attendant while a third control button 228 is a call button reset.

Figure 4:
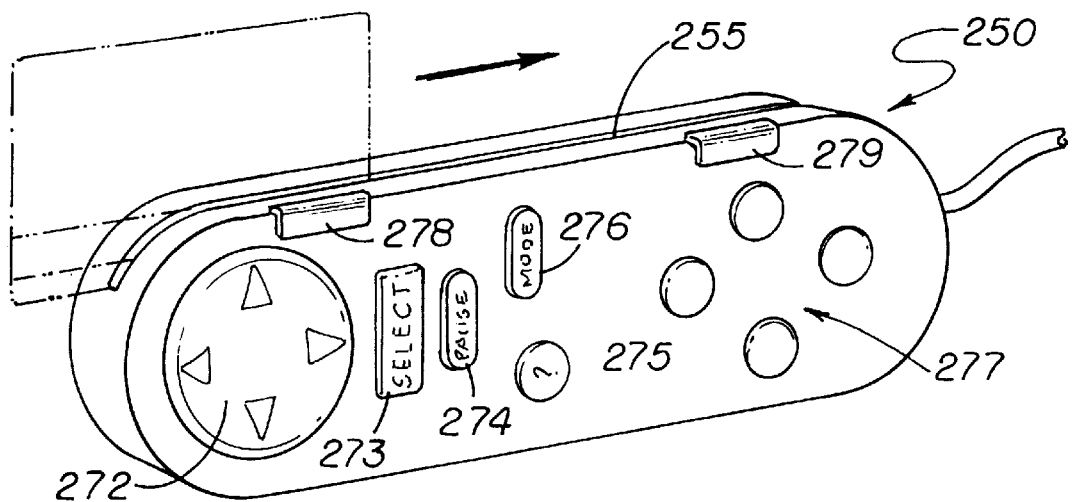
FIG. 4 is a perspective view of a display side of the passenger control handset of FIG. 3.

As shown in FIGS. 3–4, coupled to the PCU 220 through a plastic coated cable 245 protecting a plurality of communication lines as described below, the PCH 250 collectively functions as both a telephone handset and a display control unit for a display. In general, the PCH 250 is constructed so that the first edge 251 is engaged with the locking mechanism 240 when inserted into the compartment 230 as well as second, third and fourth edges 252–254. A credit card reader 255 (e.g., a magnetic strip card reader) may be adapted along the fourth edge 254 of the PCH 250 between its "hot keys" 278–279 of the display control unit portion and its handset side 261 discussed below. This allows immediate payment to be made by the passenger for telephone calls and for use of its interactive entertainment activities.

The features for the telephone handset are placed on the handset side 261 of the PCH 250 and resemble well-known cellular phone handsets. More specifically, the features include a speaker and microphone 262–263 to provide voice audio between the passenger and the recipient of the call, a liquid crystal display ("LCD") 264 to display information (e.g., the phone number dialed, the duration of the call, etc.) and a plurality of call input buttons 265 labeled from 0–9 including symbols "#" and "*". In addition, the handset side 261 includes a plurality of handset control buttons 266 including at least an on/off button 266a, a volume control button 266b. Optionally, other control buttons may include a "function" button utilized to alter status of the PCH's memory for speed dialing modifications, a "clear" button for dial correction, a "send" button to transmit the dialed phone number to the SEU and the "end" button to indicate the end of communication.

Referring to FIG. 4, the features for the display control unit are placed on a display side 271 of the PCH 250. These features include a direction controller 272, a "select" button 273, a "pause" button 274, a help ("?") button 275, a "mode" button 276, an ABXY button grid 277 and the pair of hot keys 278–279. The direction controller 272, select and pause buttons 273–274, the ABXY button grid 277 and the pair of hot keys 278–279 are video game controls used by many commercially available video systems such as those made and manufactured by Nintendo of Japan. The "help" button 275 may be used to signal the display to provide a help menu providing explanations to be read by the passenger while the "mode" button 276 is used, for example, to select one of a number of available display operations.

Figure 5:
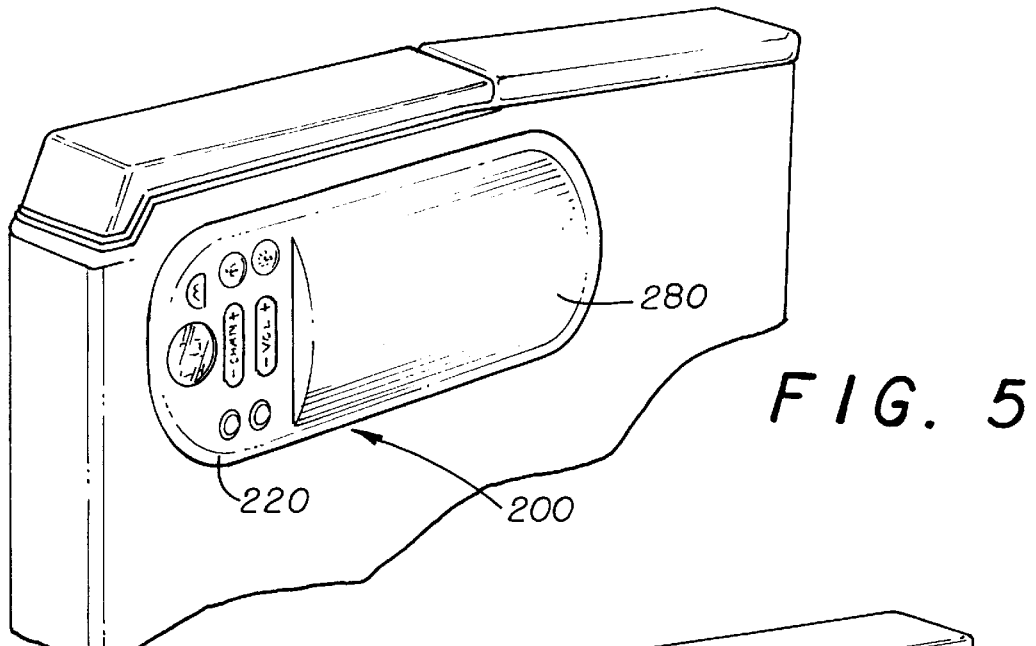
FIG. 5 is a perspective view of a second embodiment of the integrated electronic system including the island unit of FIG. 3 without implementing the passenger control handset.

Referring now to FIG. 5, a perspective view of another embodiment of the integrated electronic system is shown. The integrated electronic system 200 includes the PCU 220 featuring the compartment sufficiently sized to store a PCH. However, unlike FIG. 3, the PCU 220 is not adapted with a modem connector and a cover 280 is placed over the compartment for those situations where the handset is undesired. The cover 280 is coupled to the compartment through any conventional manner (e.g., clips, plastic insert pins, screws, rivets and the like). Thus, the PCH does not have to be provided immediately in the integrated electronic system where only in-flight amenity select (not telephone and interactive entertainment) is desired; however, the PCH can be implemented at a later point in time.

Referring to FIG. 6, a perspective view of a third embodiment of the integrated electronic system is shown. The integrated electronic system 200 includes the PCU 220 as a separate piece from the compartment 230 designated to contain the PCH 250. While the PCH 250 (if implemented) still would be coupled to the PCU 220, the PCU 220 may be placed at a different location in the armrest 205, a different armrest or any other location in the passenger seat. The coupling would be provided through a cable (not shown) routed around the frame of the passenger seat before cushions and fabric are applied.

Figure 7:
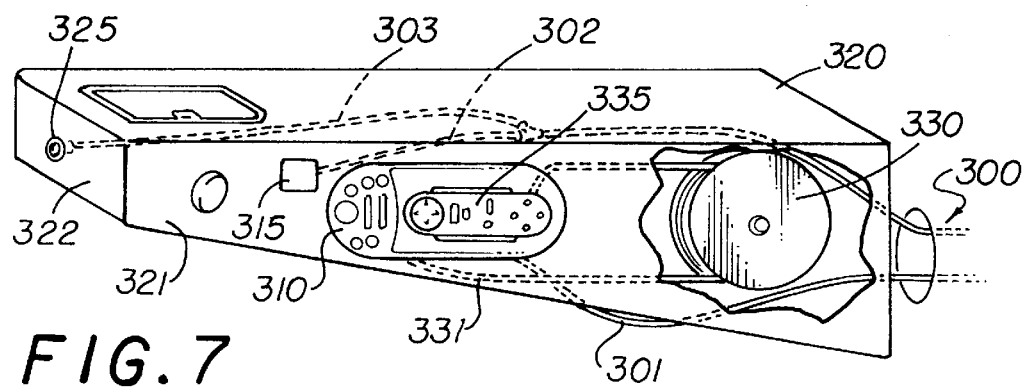
FIG. 7 is a general schematic view of a fourth embodiment of the integrated electronic system with the head phone and modem connectors separate from the passenger control unit.

Referring now to FIG. 7, a schematic view of a fourth embodiment of the integrated electronic system is shown. A seat cable 300 from the SEU includes a plurality of SEU communication lines (e.g., serial data lines according to RS-232 standards, audio channel lines, ground, power, etc.) which are respectively routed through cables 301–303 to the PCU 310 and the modem connector 315 positioned along an interior side 321 portion of an armrest 320 and the head phone connector 325 positioned along a front side portion 322 of the armrest 320. The PCU 310 is further coupled to the cord reel 330 through a cable 331 routed to the PCH 335. The cable 331 is sheathed with a plastic material for insulative and atmospheric protection and wound around the cord reel 330. Thus, as the PCH 335 is detached from the interior side 321 of the armrest 320, the cord reel 330 unwinds the cable 331 but maintains the cable 331 to be generally taut. As the PCH 335 is being inserted into its intended compartment in the interior side 321 of the armrest 320, the cord reel 330 retracts the cable 331 due to its angular biased configuration.

Figure 8:
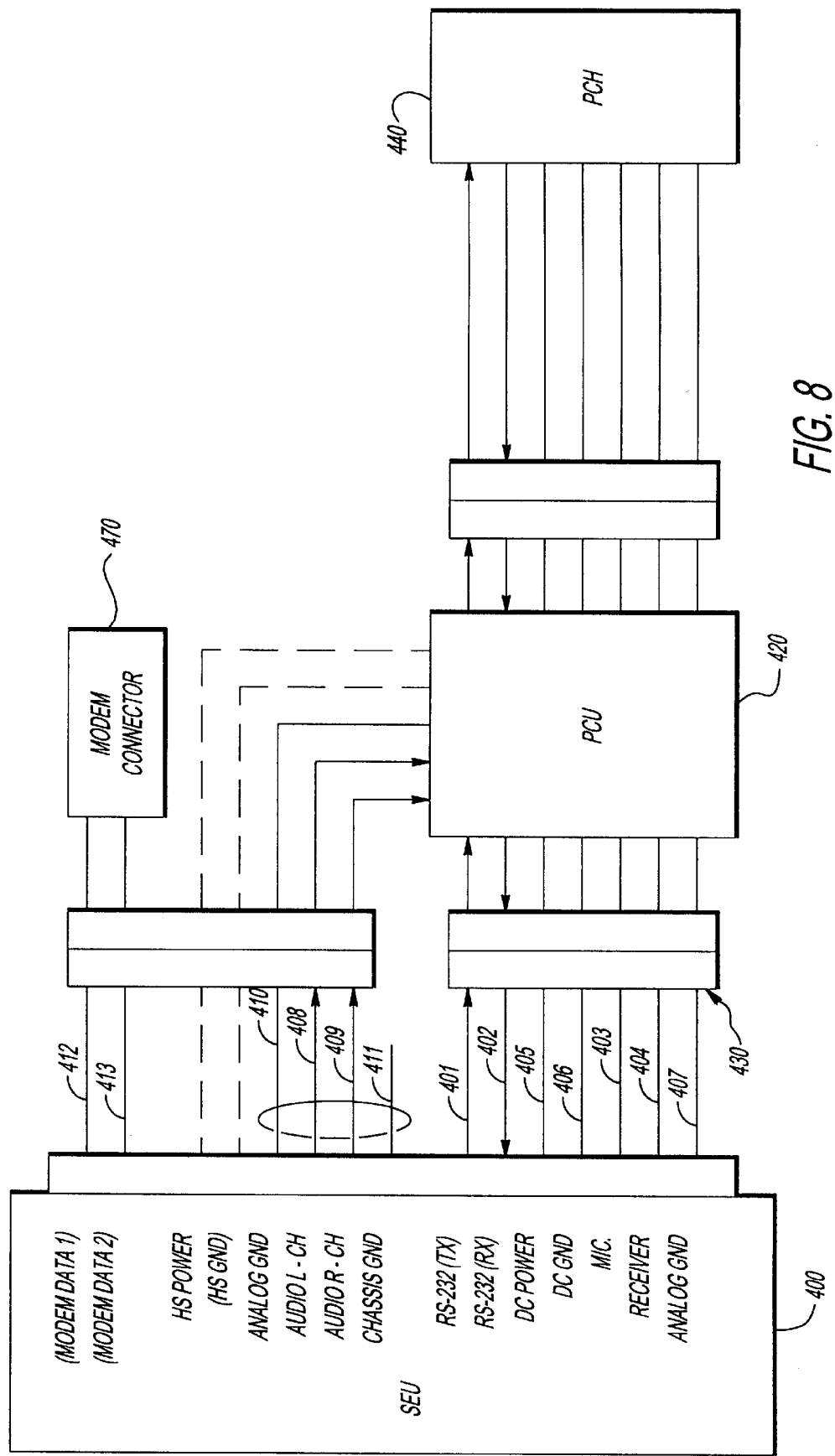
FIG. 8 is a general schematic view of one embodiment of the interconnections between the passenger control unit, passenger control handset and the SEU.

Referring now to FIG. 8, a general schematic diagram illustrates the communication paths between the SEU and the integrated electronic system such as that shown in FIG. 5. The SEU 400 is coupled to the PCU 420 through a universal interface 430 featuring serial data lines, analog lines, power and ground. The PCU 420 is further routed to the PCH 440 utilizing the same interface scheme. As shown, the universal interface 430 supports at least telephony and interactive entertainment activities through the communication lines shown in Table A.

TABLE A

Communication Lines Associated with the Universal Interface

| Comm Line No. | Name | Description |
| --- | --- | --- |
| 1 | RS-232(Tx) | Data Transmit line |
| 2 | RS-232(Rx) | Data Receive line |
| 3 | DC Power | Power line |
| 4 | DC Ground | Ground for lines 1–3 |
| 5 | Microphone | Audio Transmit line |
| 6 | Receiver | Audio Receive line |
| 7 | Analog GND | Ground for lines 5&6 |

The serial data lines 401–402 are illustrated as a low impedance serial data line 401 in accordance with a well-recognized RS-232 standard (hereinafter referred to as "RS-232(Tx) line 401") that serially transfers information from the SEU 400 to the PCU 420 and a low impedance RS-232 (Rx) line 402 that serially transfers information from the PCU 420 to the SEU 400. The reason that the serial data lines are preferred over parallel data lines is that the length of the communication line that interconnects the PCU 420 to the SEU 400 is usually over ten feet which warrants serial communication for reliability concerns if cost-effectiveness is a concern. Thus, any voltage drop caused by the impedance in the cable would have no appreciable effect on the RS-232 twelve volt signals. It is contemplated that other types of serial data lines may be used according to other RS-4xx standards (e.g., RS-423 and the like).

The analog lines 403–404 are illustrated as a microphone line 403 that transmits audio sound in an analog format originating from the PCH 440 and a receiver line 404 that transfers audio back to the PCH 440. The power line 405 is represented as a DC Power line which provides approximately twelve volts (≈12 V) for use by the PCU 420. The ground lines 406–407 include a DC Ground line 406 and an Analog Ground line 407 which provide a ground reference to circuitry within the PCU 420 and a ground reference for the analog circuitry in the PCH 440, respectively.

As further shown, the PCU 420 is further coupled to the PCH 440 utilizing the same interface scheme so that the PCH 440 can be electrically coupled to the SEU 400 without being mechanically coupled thereto. However, the voltage placed on the power line from the PCU 420 to the PCH 440, corresponding to the DC Power line 405, is regulated or converted to a voltage approximate to a recognized Transistor-Transistor Logic ("TTL") voltage level ($\approx$5 V) in those implementations where the PCU 420 and PCH 440 are in close proximity.

Referring still to FIG. 8, if the head phone connector is incorporated within the PCU 420 of the integrated electronic system, the PCU 420 would be adapted to receive audio channel signals and ground from the SEU 400. More specifically, the SEU 400 transmits stereophonic audio through left and right audio channel signals 408–409 into the head phone connector in a manner so that one of its dual inputs receives left channel audio while the other input receives right channel audio. Upon plugging a connector from a headset into the head phone connector, the passenger can enjoy audio in a stereo format. The SEU further provides an analog ground 410 and utilizes chassis ground 411 for noise reduction. Although the modem connector is illustrated having two data lines 412–413 and separate from the PCU 420, it is contemplated that the PCU 420 may be adapted to contain the modem connector as shown in FIG. 3.

Figure 9:
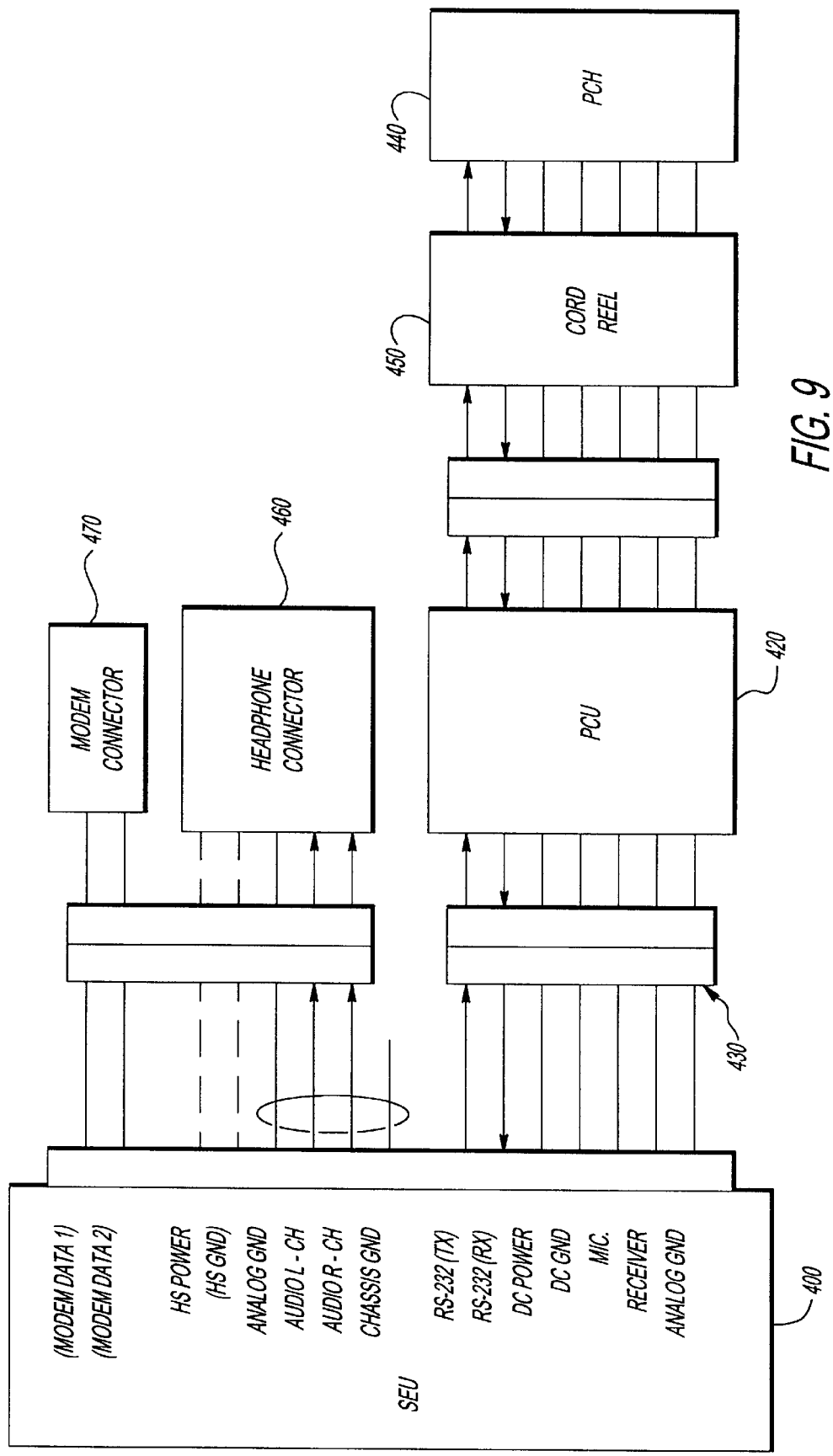
FIG. 9 is a general schematic view of another embodiment of the interconnections between the passenger control unit, passenger control handset and the SEU.

Referring now to FIG. 9, a general schematic diagram of the communication paths between the SEU 400 and an embodiment of an integrated electronic system featuring the cord reel 450 and absent a head phone connector 460 or a modem connector 470 is shown (see FIG. 6). The universal interface 430 featuring the serial data lines, analog lines, power and ground is identical to that shown in FIG. 8. However, the audio channel signals and analog ground associated with the head-phone connector are not transmitted to the PCU 420, but rather directly to the head phone connector 460.

Figure 10:
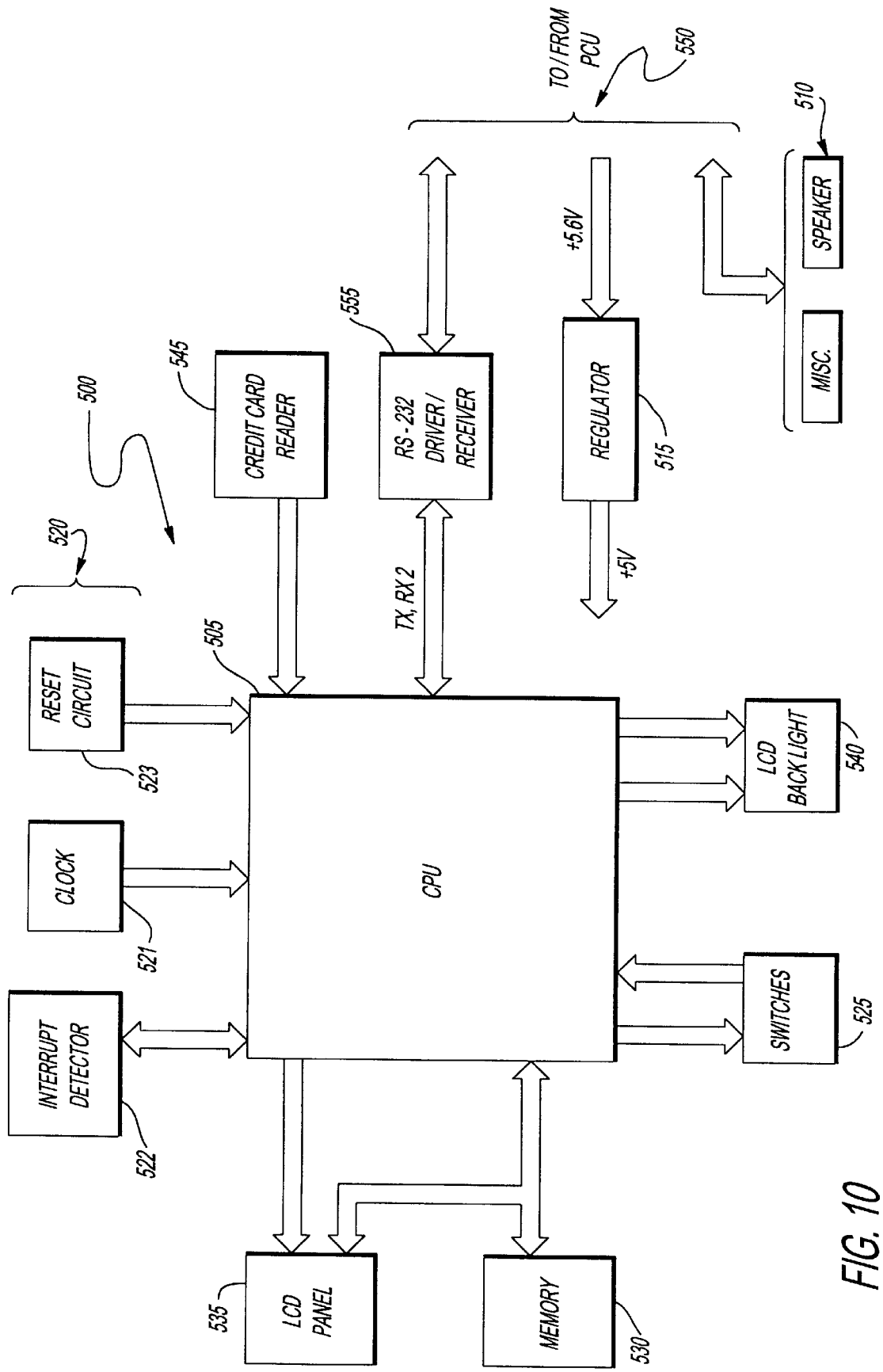
FIG. 10 is a general block diagram of the circuitry of the passenger control handset and its interconnections to the passenger control unit.

Referring to FIG. 10, a general block diagram of the preferred circuitry of the PCH and its interconnections to the PCU is shown. The PCH 500 comprises a central processing unit ("CPU") 505 which controls the general operations of the PCH 500 and a microphone/speaker combination 510 which collectively operates as an input/output ("I/O") device in transferring audio information to or from the PCU through a first communication path 550. The CPU 505 as well as other circuitry within the PCH 500 receive DC power from a power regulator 515 which receives DC power from the first communication path 550 and regulates an intermediary voltage on a DC power line to provide approximately five volts ($\approx$5 V) to the circuitry of the PCH 500.

The CPU 505 is coupled to control circuitry 520 including but not limited to an internal clock 521, an interrupt detector 522 and a reset circuit 523. The control circuitry 520 is used to controls the general functionality of the CPU 505. More specifically, the internal clock 521 provides a clock signal (e.g., 16 megahertz "MHz") to the CPU 505 to control its speed of operation. The interrupt detector 522 and the reset circuit 523 are implemented to indicate to the CPU 505 when its supply of power has been interrupted and when power supplied to the CPU 505 is sufficient to guarantee its correct operation, respectively.

As shown, the CPU 505 is further coupled to a number of input and/or output devices such as a plurality of switches 525, a memory element 530, a liquid crystal display "LCD" panel 535, a LCD backlight 540 and a credit card reader 545. The plurality of switches 525 are positioned in the PCH 500 to signal to the CPU 505 which call input buttons or handset control buttons (See FIG. 3) are being depressed. The memory element 530, preferably made of programmable memory (e.g., Flash memory), contains information (e.g., software control programs, error code, state information and the like) and provides storage for use by the CPU 505. The LCD panel 535 receives information from the CPU 505 to control the nature of its display. The LCD backlight 540 is further controlled by the CPU 505 to control the contrast of the LCD panel 535. The credit card reader 545 is an input device that transfers digital data obtained a credit card (e.g., a Smartcard™, magnetic stripped credit card and the like) inserted or swiped through the credit card reader 545. Preferably, the CPU 505 transfers that information for the SEU which may perform credit card authorization before allowing the passenger to utilize the telephonic features of the handset or other services requiring payment.

As further shown in FIG. 10, the PCH 500 communicates with the PCU through the first communication path 550 controlled by a serial driver/receiver device 555, namely a RS-232 driver/receiver device provided RS-232 serial data lines are used. The serial driver/receiver device 555 receives the digital data provided by the CPU 505 and serially transmits that data through a first communication line of the first communication path 550. Concurrently, audio received by the microphone is transmitted through another communication line. The communication line configuration of the first communication path 550 is shown in Table B.

TABLE B

Communication Lines Associated with the First Communication Path

| Line No. | Name | Description |
| --- | --- | --- |
| 1 | RS-232(Tx) | Serial Data transmit from PCH to PCU |
| 2 | DC Power (+5.6V) | Intermediary voltage reference from PCU to PCH. |
| 3 | RS-232(Rx) | Serial Data receive from PCU to PCH |
| 4 | DC GND | Ground |
| 5 | MIC | Audio transmit from PCH to PCU |
| 6 | Analog GND | Ground |
| 7 | Receiver | Audio Receive from PCU to PCH |
| 8 | Shield | Noise Reduction |

Figure 11:
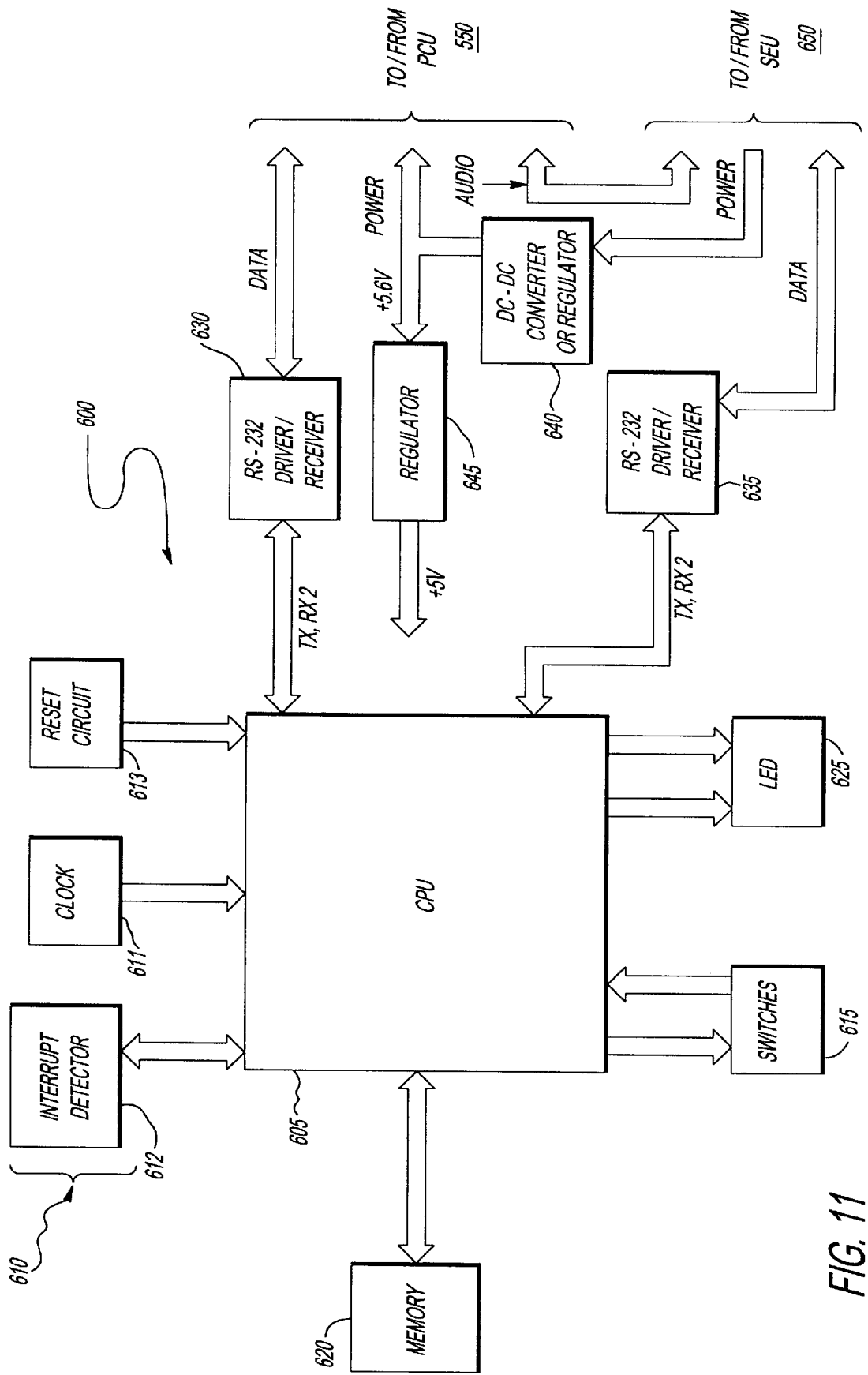
FIG. 11 is a general block diagram of the circuitry of the passenger control unit and its interconnections to both the passenger control handset and the SEU.

Referring to FIG. 11, a general block diagram of the circuitry of the PCU and its interconnections to the SEU is shown. Similar to the PCH 500 of FIG. 10, the PCU 600 comprises a central processing unit ("CPU") 605, which controls the general operations of the PCU 600, and control circuitry 610 including but not limited to an internal clock 611, an interrupt detector 612 and a reset circuit 613. The CPU 605 is further coupled to I/O circuitry such as a plurality of switches 615, a memory element 620 and a light emitting diode ("LED") display 625. The plurality of switches 615 are positioned in the PCU 600 to signal to the CPU 605 which audio control buttons or miscellaneous control buttons are being depressed (See FIG. 3). The memory element 620, preferably made of programmable memory (e.g., Flash memory), contains information (e.g., software control programs, error code, state information) and provides storage for use by the CPU 605. The LED display 625 is a seven LED segment display that receives information from the CPU 605 to illuminates the appropriate LEDs to display the channel number.

As further shown in FIG. 11, the PCU 600 communicates with the PCH through the first communication path 550 and communicates with the SEU through a second communication path 650. These data transmission through the communication paths 550 and 650 are controlled by a first serial driver/receiver device 630 and a second serial driver/receiver device 635 (e.g., RS-232 serial data drivers if RS232C data lines are used). For data transmissions between the SEU and the PCH, the CPU 605 operates as a conduit without subjecting the data to further processing.

However, the DC power provided by the SEU is translated from its initial voltage level (e.g., approximately 12 V normally utilized by RS-232 serial data lines) to the intermediary voltage level (approximately 5.6 V). More specifically, the PCU 600 includes one or more DC-DC converter(s) 640 (or DC regulator(s)) to translate 12 V from the SEU into approximately 5.6 V which is routed through the first communication path 550. Another regulator 645 is implemented within the PCU 600 to translate the 5.6 V, which is placed on the DC power line of the first communication path 550, into approximately 5 V for use by the circuitry of the PCU 600. The audio information, transferred from the microphone or received by the SEU for the speaker of the PCH, is directly routed between the first and second communication paths 550 and 650 without any translation or any processing by the CPU 605. The communication line configuration of the second communication path 650 is shown in Table C.

TABLE C

Communication Lines Associated with the Second Communication Path

| Line No. | Name | Description |
|---|---|---|
| 1 | RS-232(Tx) | Serial Data transmit from PCU to SEU |
| 2 | DC Power (+12V) | Initial Voltage Reference (≈12V) from SEU to PCU |
| 3 | RS-232(Rx) | Serial Data receive from SEU to PCU |
| 4 | DC GND | Ground |
| 5 | MIC | Audio transmit from PCU to SEU |
| 6 | Analog GND | Ground |
| 7 | Receiver | Audio Receive from SEU to PCU |
| 8 | Shield | Noise reduction |

The present invention described herein may be designed in many different embodiments and using many different configurations. As discussed herein, the system architecture of the present invention is flexible enough so that the PCH does not have to be implemented concurrently with the PCU and if such implementation is desirable, it may be easily accomplished by connecting the PCH to the PCU rather than directly to the SEU. While the present invention has been described in terms of various embodiments, other embodiments may come to mind to those skilled in the art without departing from the spirit and scope of the present invention. The invention should, therefore, be measured in terms of the claims which follow.

What is claimed is:

1. An integrated electronic system comprising;
a passenger control handset including a telephone handset and a hand-held display control unit;
a first plurality of communication lines including at least one communication line supporting a transmission of digital data and at least one communication line supporting a transmission of analog data;
a passenger control unit connected to the first plurality of communication lines, the passenger control unit capable of receiving said analog data from the telephone handset and said digital data from the display control unit of the passenger control handset; and
a universal interface connected to said passenger control unit, said universal interface including a second plurality of communication lines of which at least one communication line is used to continue transmission of said digital data and at least one communication line is used to continue transmission of said analog data.

2. The integrated electronic system according to claim 1, wherein said at least one communication line of the second plurality of communication lines used to transmit said digital data includes a data transmit line serially propagating said digital data from said passenger control unit to a multiple seat electronics unit and a data receive line serially propagating said digital data from the multiple seat electronics unit to said passenger control unit.

3. The integrated electronic system according to claim 2, wherein said data transmit line and said data receive line are associated with a RS-232 standard.

4. The integrated electronic system according to claim 2, wherein said at least one communication line for transmission of said digital data further includes a DC power line and a DC ground line.

5. The integrated electronic system according to claim 2, wherein said at least one communication line of the second plurality of communication lines used to transmit said analog data includes a microphone line propagating analog data received by said passenger control unit from said passenger control handset to the multiple seat electronics unit and a receiver line propagating analog data from the multiple seat electronics unit through said passenger control unit and to a passenger control handset.

6. The integrated electronic system according to claim 5, wherein said at least one communication line for transmission of said analog data further includes an analog ground.

7. The integrated electronic system according to claim 1, wherein said universal interface and an interface formed by said first plurality of signal lines are identical.

8. A telecommunication system adapted for use in a commercial aircraft, the telecommunication system comprising:
a multiple seat electronics unit; and
a plurality of integrated electronic systems coupled to said multiple seat electronics unit, each of said plurality of integrated electronic systems including
a passenger control unit interconnected to said multiple seat electronics unit through a universal interface including a first plurality of communication lines of which at least one communication line is used to transmit digital data and at least one communication line is used to transmit analog audio data, and
a passenger control handset interconnected to the passenger control unit through a second plurality of communication lines, said passenger control handset communicating with said multiple seat electronics unit by transmitting both said digital data and said analog audio data through said second plurality of communication lines to said passenger control unit and said passenger control unit routing said digital data and analog audio data through said universal interface to said multiple seat electronics unit.

9. The telecommunication system according to claim 8, wherein the passenger control unit further includes a compartment having a recessed portion in which a cover is used to cover said recessed portion of said compartment when said passenger control handset is not implemented herein.

10. The telecommunication system according to claim 8, wherein said at least one communication line of said first plurality of communication lines used to transmit said digital data includes a data transmit line serially propagating said digital data from said passenger control unit to said multiple seat electronics unit and a data receive line serially propagating said digital data from the multiple seat electronics unit to said passenger control unit.

11. The telecommunication system according to claim 10, wherein said data transmit line and said data receive line of said first plurality of communication lines are associated with a RS-232 standard.

12. The telecommunication system according to claim 11, wherein said at least one communication line of said first plurality of communication lines used to transmit said digital data further includes a DC power line and a DC ground line.

13. The telecommunication system according to claim 12, wherein at least one communication line of said first plurality of communication lines used to transmit said analog audio data includes a microphone line propagating analog audio data received by said passenger control unit from said passenger control handset to the multiple seat electronics unit and a receiver line propagating analog audio data from the multiple seat electronics unit through said passenger control unit and to a passenger control handset.

14. The telecommunication system according to claim 13, wherein said at least one communication line of said first plurality of communication lines used to transmit said analog audio data further includes an analog ground.

15. The telecommunication system according to claim 14, wherein said universal interface between said passenger control unit and said multiple seat electronics unit is identical to an interface formed by said second plurality of communication lines.

16. An integrated electronic system comprising:

a passenger control handset including a telephone handset and a hand-held display control unit;

a plurality of communication lines including a first communication line supporting a transmission of digital data and a second communication line supporting a transmission of analog data;

a passenger control unit connected to the first plurality of communication lines, the passenger control unit capable of receiving said analog data over the second communication line and said digital data over the first communication line; and a universal interface connected to said passenger control unit, said universal interface including a second plurality of communication lines of which at least one communication line is used to continue transmission of said digital data and at least one communication line is used to continue transmission of said analog data.

* * * * *